US012494161B1

(12) United States Patent
Lai et al.

(10) Patent No.: US 12,494,161 B1
(45) Date of Patent: Dec. 9, 2025

(54) DISPLAY PANEL AND DISPLAY DEVICE

(71) Applicant: Xiamen Tianma Display Technology Co., Ltd., Xiamen (CN)

(72) Inventors: Qingjun Lai, Xiamen (CN); Jianlong Wu, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/924,214

(22) Filed: Oct. 23, 2024

(30) Foreign Application Priority Data

Jul. 25, 2024 (CN) ........................ 202411011735.4

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2300/0819* (2013.01); *G09G 2300/0861* (2013.01); *G09G 2310/08* (2013.01); *G09G 2320/0233* (2013.01); *G09G 2320/0247* (2013.01); *G09G 2320/045* (2013.01)

(58) Field of Classification Search
CPC ... G09G 3/32–3291; G09G 2300/0819; G09G 2300/0861; G09G 2310/08; G09G 2320/0233; G09G 2320/0247; G09G 2320/045
See application file for complete search history.

(56) References Cited

U.S. PATENT DOCUMENTS

| | | | | |
|---|---|---|---|---|
| 11,875,717 B2 * | 1/2024 | Zhang | G09G 3/20 |
| 12,136,374 B2 * | 11/2024 | Zhang | G09G 3/20 |
| 12,183,238 B2 * | 12/2024 | Zhang | G09G 3/3233 |
| 12,236,874 B2 * | 2/2025 | Park | G09G 3/3233 |
| 12,243,460 B2 * | 3/2025 | Zhang | G09G 3/2018 |
| 12,272,284 B2 * | 4/2025 | Zhang | G09G 3/20 |
| 12,293,690 B2 * | 5/2025 | Zhang | G09G 3/3233 |
| 2022/0189377 A1 * | 6/2022 | Wang | G09G 3/3266 |
| 2022/0335872 A1 * | 10/2022 | Zhang | G09G 3/3233 |
| 2024/0013714 A1 * | 1/2024 | Zhang | G09G 3/3208 |
| 2025/0218378 A1 * | 7/2025 | Park | G09G 3/3233 |

* cited by examiner

*Primary Examiner* — Gene W Lee
(74) *Attorney, Agent, or Firm* — Anova Law Group, PLLC

(57) ABSTRACT

The present disclosure provides a display panel and a display device. A display area of the display panel includes a plurality of pixel circuits arranged in an array. In a same pixel circuit, a bias adjustment module provides a bias adjustment signal to a first electrode of a driving transistor in a bias adjustment phase. The display mode of the display panel includes a first mode. In the first mode, at least some of the pixel circuits are first pixel circuits. A driving cycle of a first pixel circuit includes a data writing frame and a holding frame. The bias adjustment module of the first pixel circuit provides a first bias adjustment signal in the data writing frame, and a second bias adjustment signal in the holding frame, where a voltage of the first bias adjustment signal is different from a voltage of the second bias adjustment signal.

20 Claims, 10 Drawing Sheets

DISPLAY PANEL AND DISPLAY DEVICE

CROSS-REFERENCE TO RELATED APPLICATION

The present application claims priority of Chinese Patent Application No. 202411011735.4, filed on Jul. 25, 2024, the entire content of which is hereby incorporated by reference.

TECHNICAL FIELD

The present application relates to the field of display technology, in particular to a display panel and a display device.

BACKGROUND

As the requirements for display technology become increasingly higher, people have increasingly higher needs for the display performance of display panels.

Currently, existing display panels have flickering problems when operating, and the display performance of different display areas is different, resulting in split-screen phenomena in the display images.

SUMMARY

A first aspect of the present disclosure provides a display panel including a display area, the display area including a plurality of pixel circuits arranged in an array, a pixel circuit of the plurality of pixel circuits including a driving module, a bias adjustment module and a light-emitting element, where: in the same pixel circuit, the driving module is configured to provide a driving current for the light-emitting element in a light-emission phase, where the driving module includes a driving transistor, the bias adjustment module is electrically connected to a first electrode of the driving transistor, and the bias adjustment module is configured to provide a bias adjustment signal to the first electrode of the driving transistor in a bias adjustment phase; a display mode of the display panel includes a first mode, and in the first mode, at least some of the pixel circuits are first pixel circuits; and a driving cycle of a first pixel circuit includes a data writing frame and a holding frame, a bias adjustment module of the first pixel circuit provides a first bias adjustment signal in a bias adjustment phase of the data writing frame, and provides a second bias adjustment signal in a bias adjustment phase of the holding frame, where a voltage of the first bias adjustment signal is different from a voltage of the second bias adjustment signal.

A second aspect of the present disclosure provides a display device including a display panel, where display panel including a display area, the display area including a plurality of pixel circuits arranged in an array, a pixel circuit of the plurality of pixel circuits including a driving module, a bias adjustment module and a light-emitting element, where: in the same pixel circuit, the driving module is configured to provide a driving current for the light-emitting element in a light-emission phase, where the driving module includes a driving transistor, the bias adjustment module is electrically connected to a first electrode of the driving transistor, and the bias adjustment module is configured to provide a bias adjustment signal to the first electrode of the driving transistor in a bias adjustment phase; a display mode of the display panel includes a first mode, and in the first mode, at least some of the pixel circuits are first pixel circuits; and a driving cycle of a first pixel circuit includes a data writing frame and a holding frame, a bias adjustment module of the first pixel circuit provides a first bias adjustment signal in a bias adjustment phase of the data writing frame, and provides a second bias adjustment signal in a bias adjustment phase of the holding frame, where a voltage of the first bias adjustment signal is different from a voltage of the second bias adjustment signal.

It should be understood that the content described in this section is not intended to identify the key or important features of the embodiments of the present disclosure, nor are they intended to limit the scope of the present disclosure. Other aspects of the present disclosure may be understood by those skilled in the art in light of the description, the claims, and the drawings of the present disclosure.

BRIEF DESCRIPTION OF THE DRAWINGS

In order to more clearly illustrate the technical solutions of the embodiments of the present disclosure, the drawings required for use in the embodiments will be briefly introduced below. Apparently, the drawings described below are only some embodiments of the present disclosure. For persons having ordinary skills in the art, it should be apparent that the basic concepts of device structure, driving method and manufacturing method disclosed and suggested by the embodiments of the present disclosure may be expanded and extended to other structures and drawings, and should be within the scope of the claims of the present disclosure.

DETAILED DESCRIPTION

In order to make clear the purpose, technical solution and advantages of the present disclosure, the technical solution of the present disclosure will be clearly and completely described through implementation methods with reference to the accompanying drawings in the embodiments of the present disclosure. Apparently, the described embodiments are some of the embodiments of the present disclosure, but not all of the embodiments. Based on the basic concepts disclosed and suggested by the embodiments of the present disclosure, all other embodiments obtained by those skilled in the art are within the scope of protection of the present disclosure.

Figure 1:
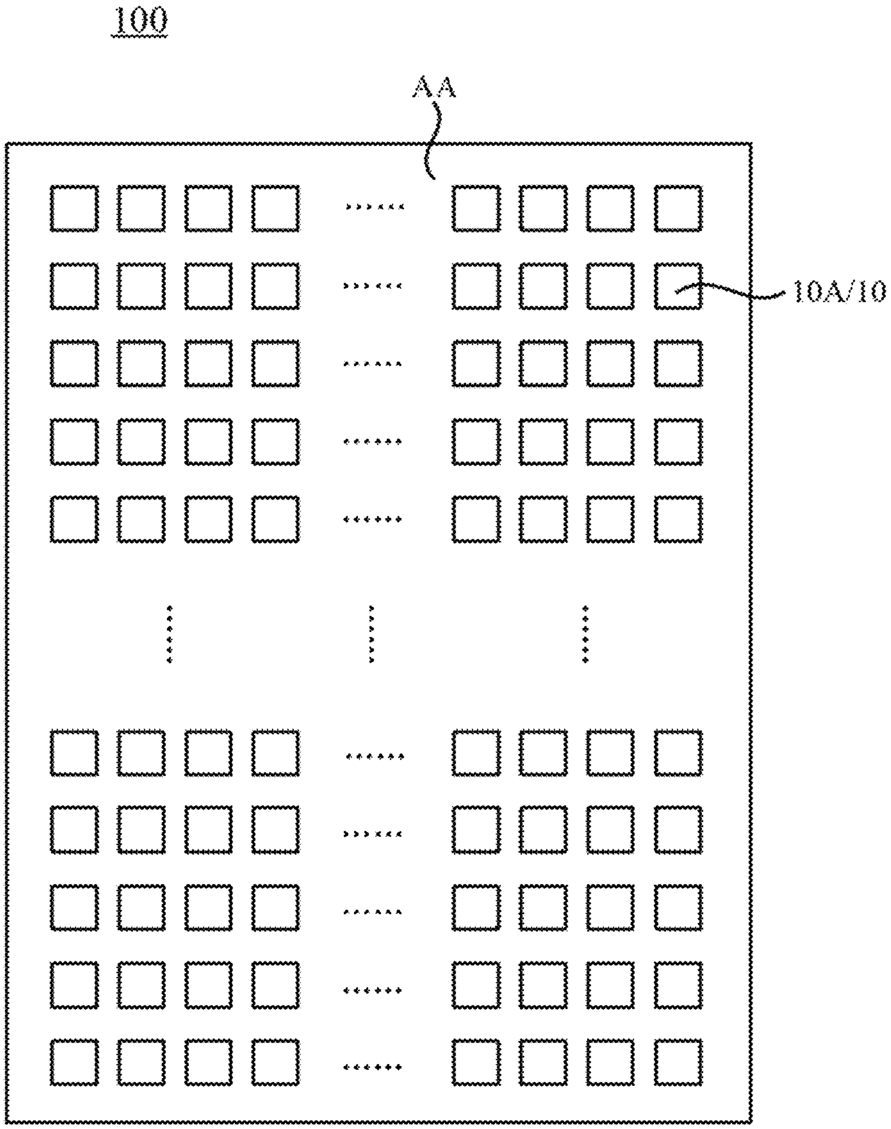
FIG. 1 is a schematic diagram of a display panel in accordance with an embodiment of the present disclosure.
Figure 2:
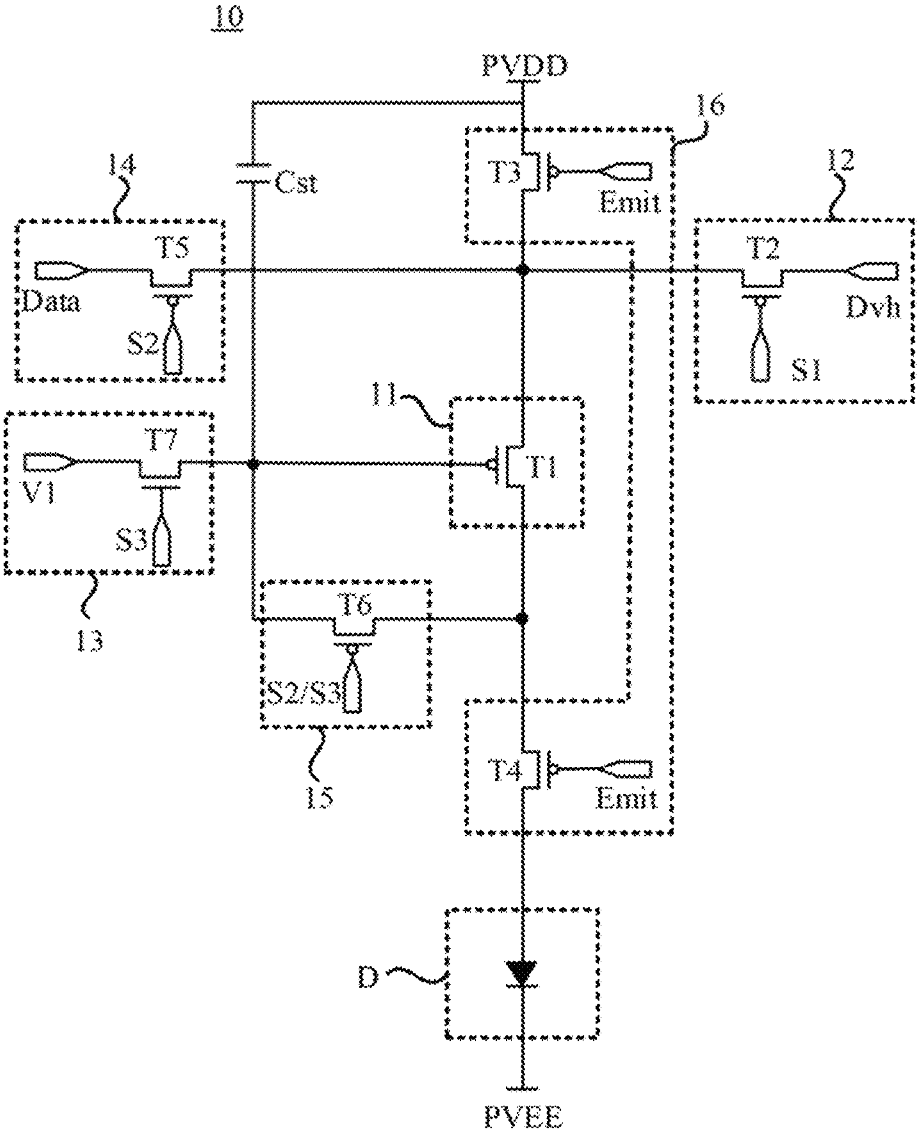
FIG. 2 is a schematic diagram of a pixel circuit in accordance with an embodiment of the present disclosure.

FIG. 1 is a schematic diagram of a display panel in accordance with an embodiment of the present disclosure, and FIG. 2 is a schematic diagram of a pixel circuit in accordance with an embodiment of the present disclosure.

As shown in FIG. 1 and FIG. 2, a display panel 100 includes a display area AA, the display area AA includes a plurality of pixel circuits 10 arranged in an array, and the pixel circuit 10 includes a driving module 11, a bias adjustment module 12 and a light-emitting element D.

In the same pixel circuit 10, the driving module 11 is configured to provide a driving current for the light-emitting element D in a light-emission phase. The driving module 11 includes a driving transistor T1, the bias adjustment module 12 is electrically connected to a first electrode of the driving transistor T1, the bias adjustment module 12 is configured to provide a bias adjustment signal Dvh to the first electrode of the driving transistor T1 in a bias adjustment phase.

A display mode of the display panel 100 includes a first mode. In the first mode, at least some of the pixel circuits 10 are first pixel circuits 10A.

A driving cycle of the first pixel circuits 10A includes a data writing frame t1 and a holding frame t2. A bias adjustment module 12 of the first pixel circuits 10A provides a first bias adjustment signal DvhA in a bias adjustment phase of the data writing frame t1, and provides a second bias adjustment signal DvhB in a bias adjustment phase of the holding frame t2, where a voltage of the first bias adjustment signal DvhA is different from a voltage of the second bias adjustment signal DvhB.

The driving transistor T1 may be an N-channel transistor or a P-channel transistor, which is not specifically limited herein. FIG. 2 is only an exemplary illustration and does not limit the embodiments of the present disclosure.

It should be understood that, continuing to refer to FIG. 2, the pixel circuit 10 may further include an initialization module 13, a data writing module 14, a compensation module 15, a light-emission control module 16, a storage capacitor Cst and other structures, which are not specifically limited herein and may be configured according to actual needs.

Exemplarily, refer to FIG. 2, a complete driving cycle of the pixel circuit 10 includes at least one frame of data writing frame t1, and one frame of data writing frame t1 may include an initialization phase, a data writing phase, a bias adjustment phase, and a light-emission phase. In the initialization phase, the initialization module 13 is in the conducted state (i.e., "on"), and an initialization signal is written into the gate of the driving transistor T1 by the conducted initialization module 13 to initialize the potential of the gate of the driving transistor T1. In the data writing phase, the initialization module 13 is "off", so that the initialization signal is no longer written into the gate of the driving transistor T1. The data writing module 14 and the compensation module 15 are conducted, so that a data signal may be written into the gate of the driving transistor T1 through, sequentially, the conducted driving transistor T1 and compensation module 15. In the bias adjustment phase, the bias adjustment module 12 provides a bias adjustment signal Dvh to the first electrode of the driving transistor T1 to adjust the potential of the driving transistor T1, so as to ameliorate the problem of threshold voltage drift caused by the driving transistor T1 being in a bias state for a long time. In the light-emission phase, the light-emission control module 16 is in a conducted state, so that a current path is formed between a first power signal PVDD and a second power signal PVEE, so that the driving transistor T1 generates a driving current under the action of the first power signal PVDD and a data signal written into its gate, and provides the driving current to the light-emitting element D, driving the light-emitting element D to emit light, thereby realizing the image display of the display panel 100. It should be understood that in a display panel in accordance with an embodiment of the present disclosure, the structure of a pixel circuit 10 is not limited to the structure shown in FIG. 2, and may also be other structures. On the premise that the pixel circuit 10 includes a driving transistor T1, a bias adjustment module 12 and a light-emitting element D, the embodiments of the present disclosure do not specifically limit the structure of the pixel circuit 10.

Continue to refer to FIG. 2, the light-emitting element D may include one or more of a red light-emitting element, a green light-emitting element, a blue light-emitting element, a white light-emitting element, a yellow light-emitting element, a cyan light-emitting element, and a magenta light-emitting element, which is not limited herein. The light-emitting element may be a light-emitting diode, which includes but is not limited to an organic light-emitting diode (OLED), a sub-millimeter light-emitting diode (Mini LED), or a micro light-emitting diode (Micro LED).

Continue to refer to FIG. 1, when the display mode of the display panel 100 is the first mode, at least some of the pixel circuits 10 are first pixel circuits 10A, where the driving cycle of the first pixel circuits 10A includes the data writing frame t1 and the holding frame t2, that is, the display area including the first pixel circuits 10A in the display panel 100 may be considered as a low-frequency display area. In this way, when the pixel circuits 10 in the entire display area AA are all first pixel circuits 10A, it may be considered that the entire display area AA of the display panel 100 is a low-frequency display area, that is, the images of the display panel 100 are displayed at a low refresh frequency. When only some of the pixel circuits 10 in the display area AA are the first pixel circuits 10A, it may be considered that the entire display area AA includes a high-frequency display area and a low-frequency display area, where an area where the first pixel circuits 10A is located is the low-frequency display area, so that the display mode of the display panel 100 is a multi-frequency driving display mode. Therefore, a specific position and an area of the first pixel circuits 10A may be configured according to actual conditions, and FIG. 1 includes only exemplary labels and does not limit the present disclosure.

Specifically, in the same first pixel circuits 10A, the driving cycle of the first pixel circuits 10A includes the data writing frame t1 and the holding frame t2. The bias adjustment module 12 of the first pixel circuits 10A provides a first bias adjustment signal DvhA in the bias adjustment phase of the data writing frame t1, so that the first bias adjustment signal DvhA provided by the bias adjustment module 12 is transmitted to the first electrode of the driving transistor T1 in the bias adjustment phase of the data writing frame t1, so as to ameliorate the characteristic offset or hysteresis phenomenon that occurs after the driving transistor T1 operates for a long time. At the same time, the bias adjustment module 12 provides a second bias adjustment signal DvhB in the bias adjustment phase of the holding frame t2, so that the second bias adjustment signal DvhB provided by the bias adjustment module 12 is transmitted to the first electrode of the driving transistor T1 in the bias adjustment phase of the holding frame t2, which may also ameliorate the characteristic offset or hysteresis phenomenon that occurs after the driving transistor T1 operates for a long time. Since the first pixel circuit 10A operates in different phases, the degree of drift of the threshold voltage of the driving transistor T1 will also be different. In this way, the voltage of the first bias adjustment signal DvhA may be configured to be different from the voltage of the second bias adjustment signal DvhB, which may ameliorate the problem of the different brightness of the light-emitting element D caused by a difference in threshold voltage drift of the driving transistor T1 in the data writing frame t1 and the holding frame t2 in the first pixel circuit 10A, thereby facilitating improving the display uniformity of the display panel 100.

It should be noted that the voltage of the first bias adjustment signal DvhA may be greater than the voltage of the second bias adjustment signal DvhB, or the voltage of the first bias adjustment signal Dvh A may be less than the voltage of the second bias adjustment signal DvhB, which may be configured according to actual conditions.

In the disclosed embodiment, the display area of the display panel is configured to include a plurality of pixel circuits arranged in an array, and the pixel circuit includes the driving module, the bias adjustment module and the light-emitting element. In the same pixel circuit, the driving module is configured to provide the driving current to the light-emitting element in the light-emission phase. The driving module includes a driving transistor, and the bias adjustment module is electrically connected to the first electrode of the driving transistor. The bias adjustment module is configured to provide the bias adjustment signal to the first electrode of the driving transistor in the bias adjustment phase to adjust the bias state of the driving transistor, which ameliorates the threshold voltage drift problem of the driving transistor. The display mode of the display panel includes the first mode. In the first mode, at least some of the pixel circuits are the first pixel circuits. It should be understood that the first mode may be a low-frequency display mode for the entire display area, or a multi-frequency driving mode in which the entire display area includes both a low-frequency display area and a high-frequency display area. The driving cycle of the first pixel circuits includes a data writing frame and the holding frame. It should be understood that the display area where the first pixel circuits are located is the low-frequency display area. The bias adjustment module of the first pixel circuits provides the first bias adjustment signal in the bias adjustment phase of the data writing frame, and provides the second bias adjustment signal in the bias adjustment phase of the holding frame, where the voltage of the first bias adjustment signal is different from the voltage of the second bias adjustment signal. In this way, by providing different bias adjustment signals to the first electrode of the driving transistor in different operating phases, the driving transistor of the first pixel circuits has the same bias state, which may ameliorate the problem of the difference in brightness of the light-emitting elements caused by the difference in the bias state of the driving transistor in the first pixel circuits in the data writing frame and the holding frame, thereby ameliorating the flickering or split screen phenomenon of the display panel, which facilitates improving the display uniformity of the display panel.

To facilitate a detailed description of the embodiments of the present disclosure, continue to refer to FIG. 2, which only exemplarily shows the structure of a pixel circuit 10. The bias adjustment module 12 may include a bias adjustment transistor T2, a first electrode of the bias adjustment transistor T2 receiving a bias adjustment signal Dvh, a second electrode of the bias adjustment transistor T2 electrically connected to the first electrode of the driving transistor T1, and a gate of the bias adjustment transistor T2 receiving a first scanning signal S1. The first scanning signal S1 is configured to control the "on" or "off" of the bias adjustment transistor T2. When the bias adjustment transistor T2 is in a conducted state, the bias adjustment signal Dvh may be transmitted to the first electrode of the driving transistor T1 through the conducted bias adjustment transistor T2. In addition, the light-emission control module 16 includes a first light-emission control transistor T3 and a second light-emission control transistor T4, and a gate of the first light-emission control transistor T3 and a gate of the second light-emission control transistor T4 both receives a light-emission control signal Emit. The light-emission control signal Emit is configured to control the "on" or "off" of the first light-emission control transistor T3 and the second light-emission control transistor T4, which the specific structure of the pixel circuit 10 includes but is not limited to.

Figure 3:
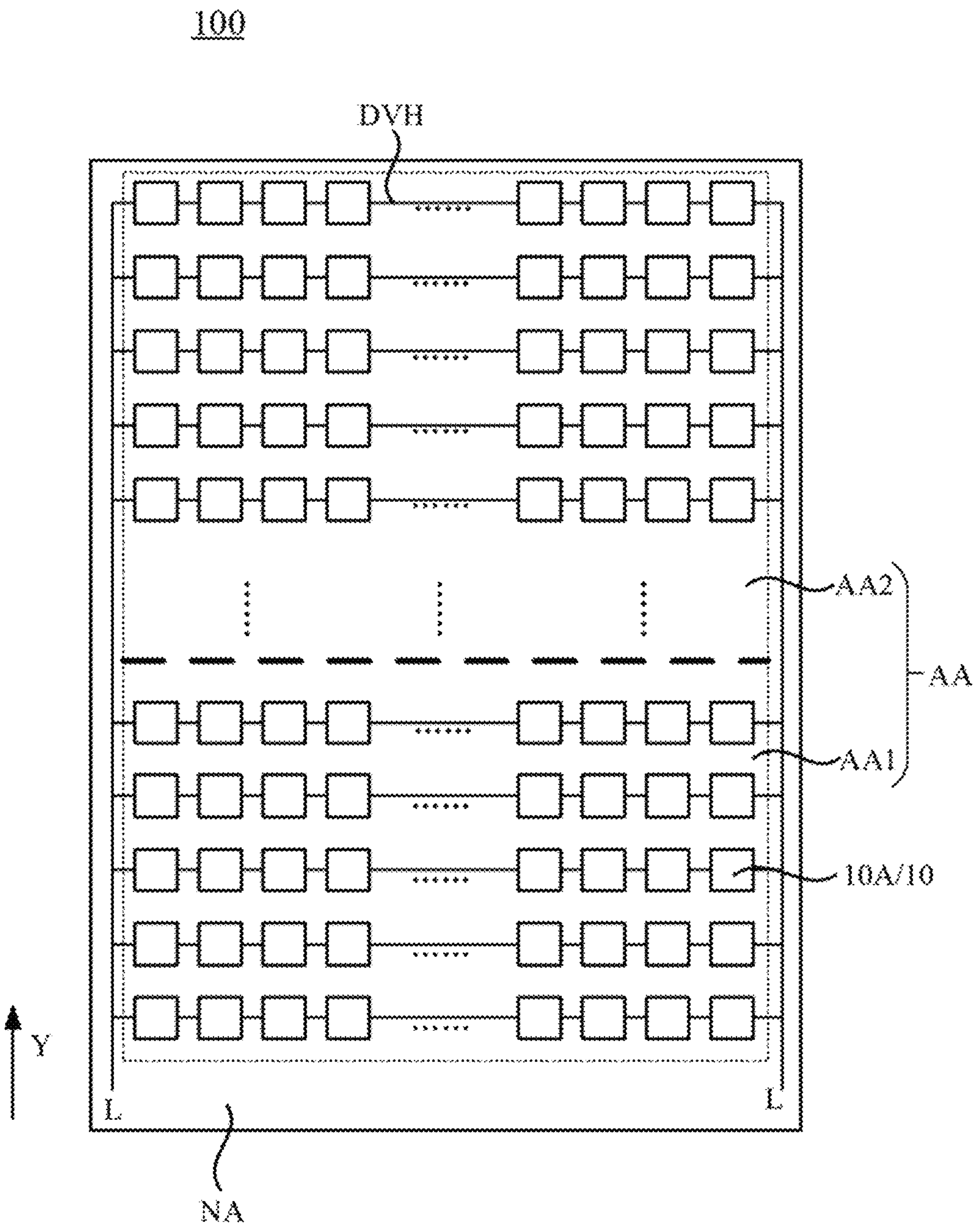
FIG. 3 is a schematic diagram of another display panel in accordance with an embodiment of the present disclosure.

Optionally, in an embodiment, FIG. 3 is a schematic diagram of another display panel in accordance with an embodiment of the present disclosure. As shown in FIG. 3, a display panel 100 includes a bias adjustment bus L and a plurality of bias adjustment signal lines DVH, the same bias adjustment signal line DVH is electrically connected to a bias adjustment module 12 of at least some of the pixel circuits 10 in a same row, and the bias adjustment bus L is electrically connected to the plurality of bias adjustment signal lines DVH.

Specifically, the display panel 100 further includes a non-display area NA, and the bias adjustment bus L is located in the non-display area NA. The plurality of bias signal lines DVH are electrically connected to the same bias adjustment bus L, so that a bias adjustment signal on the bias adjustment bus L may be provided to the plurality of bias adjustment signal lines DVH at the same time, so that the bias adjustment module 12 of each row of pixel circuits 10, when conducted, may transmit a bias adjustment signal Dvh on the bias adjustment signal line DVH to a first electrode of a driving transistor T1, so as to adjust the potential of the first electrode of the driving transistor T1 and ameliorate the problem of its threshold voltage drift.

It should be noted that the bias adjustment bus L may be one bias adjustment bus located on one side of a display area AA, or two bias adjustment buses located on both sides of the display area AA, which is not specifically limited herein. FIG. 3 is only illustrative and does not limit the present disclosure.

Optionally, refer to FIG. 3, in the first mode, the display area AA includes a plurality of sub-display areas, and the plurality of sub-display areas are arranged along the column direction Y of the pixel circuits 10. The plurality of sub-display areas include a first sub-display area AA1 and a second sub-display area AA2, and an interval between two adjacent data of the pixel circuit 10 in the first sub-display area AA1 being written into a frame t1 is greater than an interval between two adjacent data of the pixel circuit 10 in the second sub-display area AA2 being written into the frame t1. A first pixel circuit 10A is located in the first sub-display area AA1.

The first sub-display area AA1 and the second sub-display area AA2 may be configured according to actual conditions. In addition, the first sub-display area AA1 and the second sub-display area AA2 may be arranged adjacent to each other or spaced apart, which is not specifically limited herein. FIG. 3 is only an exemplary illustration and does not limit the embodiments of the present disclosure.

It should be understood that each time the pixel circuits 10 in the same sub-display area complete writing a frame of data into frame t1, the display screen switches once. The more times the display screen switches, the greater the refresh frequency of the display screen in the sub-display area. Therefore, within the same duration, the smaller the interval between two adjacent data being written into frame t1 of the pixel circuits 10 in the same sub-display area, the greater the number of times the display screen in the sub-display area switches, and the greater the corresponding refresh frequency.

Specifically, the interval between two adjacent data being written into the frame t1 of the pixel circuits 10 in the first sub-display area AA1 may be greater than the interval between two adjacent data being written into the frame t1 of the pixel circuits 10 in the second sub-display area AA2. It should be understood that the refresh frequency of the display screen in the first sub-display area AA1 is less than the refresh frequency of the display screen in the second sub-display area AA2, that is, the first sub-display area AA1 is a low-frequency refresh area, and the second sub-display area AA2 is a high-frequency refresh area. In this way, the current first mode of the display panel 100 is a multi-frequency driving display mode.

Further, the first pixel circuits 10A is located in the first sub-display area AA1, and a driving cycle of the first pixel circuits 10A includes a data line writing frame t1 and a holding frame t2, that is, the interval between two adjacent data writing frames t1 of the first pixel circuits 10A includes at least one holding frame t2. Since the interval between two adjacent data writing frames t1 of the pixel circuits 10 in the first sub-display area AA1 is greater than the interval between two adjacent data writing frames t1 of the pixel circuits 10 in the second sub-display area AA2, it can be considered that the driving cycle of the pixel circuits 10 in the second sub-display area AA2 only includes the data writing frames t1.

It should be noted that the duration of a holding frame t2 and the duration of a data writing frame t1 may be the same or different, which is not specifically limited here.

Figure 4:
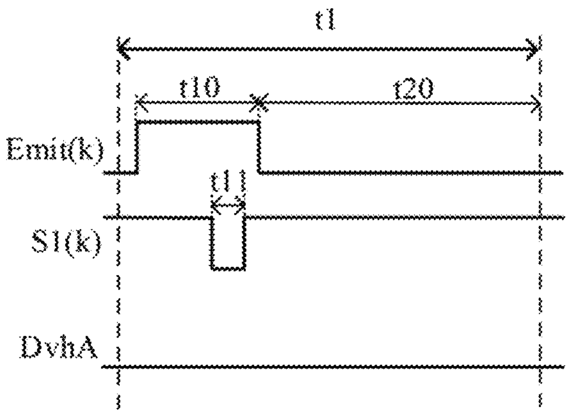
FIG. 4 is a driving timing diagram of FIG. 3.

Optionally, FIG. 4 is a driving timing diagram of FIG. 3. Refer to FIG. 2, FIG. 3 and FIG. 4, the bias adjustment bus L provides the start time of a first bias adjustment signal DvhA, which is before the bias adjustment phase of each pixel circuit 10 in the second sub-display area AA2.

Specifically, since the first pixel circuits 10A is located in the first sub-display area AA1, and the interval between two adjacent data writing frames t1 of the pixel circuits 10 in the first sub-display area AA1 is greater than the interval between two adjacent data writing frames t1 of the pixel circuits 10 in the second sub-display area AA2, it can be considered that a driving cycle of the pixel circuits 10 in the second sub-display area AA2 only includes the data writing frame t1.

Exemplarily, taking a k-th row of pixel circuits 10 as being located in the first row of the second sub-display area AA2 and k as being an integer greater than or equal to 1, FIG. 4 exemplarily shows a driving timing diagram of the k-th row of pixel circuits 10.

Continue to refer to FIG. 2 and FIG. 4, taking as an example where both the first light-emission control transistor T3 and the second light emission control transistor T4 in the light emission control module 16 are P-channel transistors, and the data writing frame t1 includes a non-light-emission phase t10 and a light-emission phase t20. In the non-light-emission phase t10, the light-emission control signal Emit is at a high level, and the first light-emission control transistor T3 and the second light-emission control transistor T4 in the light-emission control module 16 are controlled to be "off". In the light-emission phase t20, the light-emission control signal Emit is at a low level, and the first light-emission control transistor T3 and the second light-emission control transistor T4 in the light-emission control module 16 are controlled to be "on".

Continue to refer to FIG. 4, taking as an example, the enabling level of the first scanning signal S1 for controlling the bias adjustment module 12 of the pixel circuit 10 in the second sub-display area AA2 to be "on" in a bias adjustment phase t11 as a low level, and the non-light-emission phase t10 of the data writing frame t1 may include the bias adjustment phase t11. Since the driving cycle of the pixel circuits 10 in the second sub-display area AA2 only includes the data writing frame t1, the bias adjustment signal Dvh received by the bias adjustment module 12 of the pixel circuits 10 in the second sub-display area AA2 in the bias adjustment phase t11 is the first bias adjustment signal DvhA. Thus, the start time of the bias adjustment bus L providing the first bias adjustment signal DvhA is before the bias adjustment phase t11 of each pixel circuit 10 in the second sub-display area AA2 (FIG. 4 does not explicitly show the specific start time of the first bias adjustment signal DvhA, as long as it is ensured to be before the bias adjustment phase t11 of each pixel circuit 10 in the second sub-display area AA2), so that the bias adjustment signal Dvh provided by the bias adjustment module 12 of the pixel circuits 10 in the second sub-display area AA2 to the first electrode of the driving transistor T1 is the first bias adjustment signal DvhA, so as to ameliorate the problem of threshold voltage drift of the driving transistor T1. It should be noted that, during the time when the entire display panel 100 displays the same frame of an image, the operating phase of the first pixel circuits 10 in the first sub-display area AA1 of the display panel 100 may be located in the data writing frame t1, or may be located in the holding frame t2. It should be understood that if the first pixel circuits 10A in the first sub-display area AA1 also operate in the data writing frame, it is necessary to make the start time of the bias adjustment bus L providing the first bias adjustment signal DvhA to also be before the bias adjustment phase of each first pixel circuit 10A in the first sub-display area AA1, so as to ensure that in the bias adjustment phase of the data writing frame, the bias adjustment module 12 in the first pixel circuits 10A also receives the first bias adjustment signal DvhA and transmits it to the first electrode of the driving transistor T1. If the first pixel circuits 10A in the first sub-display area AA1 operate in the holding frame, it is necessary to make the bias adjustment bus L provide the second bias adjustment signal DvhB to the bias adjustment module 12 of each first pixel circuit 10A in the first sub-display area AA1. Considering the positions of the first sub-display area AA1 and the second sub-display area AA2, and the fact that the operating phase of the first sub-display area AA1 is not clearly defined, the timing shown in FIG. 4 is only the timing corresponding to the first row of pixel circuits 10 located in the second sub-display area AA2. It should be understood that the magnitudes of the enabling level and non-enabling level are related to the type of transistor controlled by the levels. In the embodiments of the present disclosure, the levels of the enabling level and the non-enabling level may be defined according to actual needs. For the convenience of description, unless otherwise specified, the following description is based on an example that the enabling level of the first scanning signal S1 that controls the bias adjustment module 12 in the pixel circuits 10 is low and the non-enabling level is high.

Figure 5:
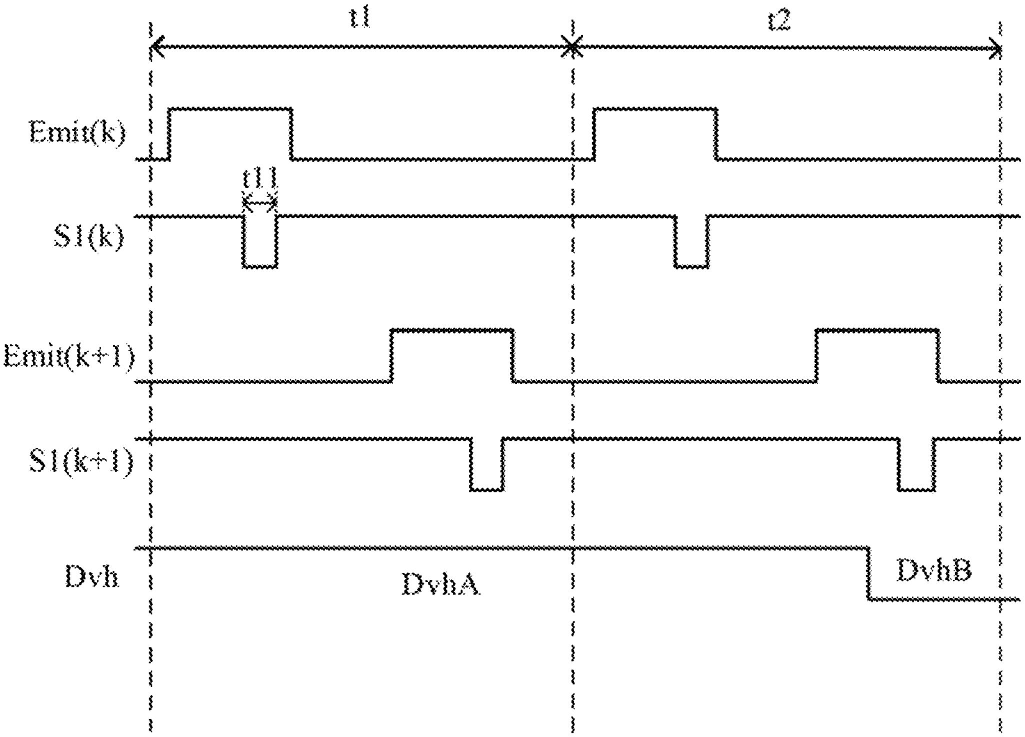
FIG. 5 is another driving timing diagram of FIG. 3.

Optionally, FIG. 5 is another driving timing diagram of FIG. 3. As shown in FIG. 5, the start time of the second bias adjustment signal DvhB provided by the bias adjustment bus L is located before the bias adjustment phase t11 of each first pixel circuit 10 in the first sub-display area AA in the holding frame t2.

Exemplarily, refer to FIG. 3 and FIG. 5, taking a k-th row of pixel circuits 10 to be the last row in the second sub-display area AA2 and a (k+1)-th row of pixel circuits 10 to be the first row in the first sub-display area AA1, the start time of the second bias adjustment signal DvhB provided by the bias adjustment bus L is located before the bias adjustment phase t11 of each first pixel circuit 10 in the first sub-display area AA1 in the holding frame t2, so as to ensure that the second bias adjustment signal DvhB provided by the bias adjustment bus L is provided to the bias adjustment module 12 of each first pixel circuit 10A in the first sub-display area AA2, and then transmitted to the first electrode of the driving transistor T1, so as to adjust the potential of the first electrode of the driving transistor T1, and ameliorate the problem of threshold voltage drift of the driving transistor T1.

It should be noted that if before the first pixel circuits 10A in the first row in the first sub-display area AA1, there are also pixel circuits 10 in the second sub-display area AA2, it is necessary to ensure that the start time of the second bias adjustment signal DvhB provided by the bias adjustment bus L is after the bias adjustment phase t11 of the last row of pixel circuits 10 in the second sub-display area AA2, so as to avoid affecting the normal operating of the pixel circuits 10 in the second sub-display area AA2.

In the disclosed embodiment, the specific voltages of the first bias adjustment signal DvhA and the second bias adjustment signal DvhB are not limited. To demonstrate the difference between the first bias adjustment signal DvhA and the second bias adjustment signal DvhB, and the leaping time of the second bias adjustment signal DvhB, FIG. 5 exemplarily shows that the voltage of the first bias adjustment signal DvhA is greater than the voltage of the second bias adjustment signal DvhB, but the disclosure is not limited herein.

Optionally, in another embodiment, continue to refer to FIG. 1 and FIG. 2, the pixel circuits 10 of the display area AA are all first pixel circuits 10A. The first pixel circuits 10A further include a data writing module 14, and the data writing module 14 is electrically connected to the first electrode of the driving transistor T1. The data writing module 14 is configured to provide a data signal to the gate of the driving transistor T1 in the data writing phase t12. Each first pixel circuit 10A includes n bias adjustment phases t11 in one driving cycle, and at least some of the bias adjustment phases t11 are located after the data writing phase t12, where n is a positive integer greater than 1. In one driving cycle, the first electrode of the driving transistor T1 in the first pixel circuits 10A writes the first bias adjustment signal DvhA in the bias adjustment phases t11 after the data writing phase t12 for a first duration $T_0$, and the first duration $T_0$ of each first pixel circuit 10A in one driving cycle is the same.

Continue to refer to FIG. 2, in the same first pixel circuits 10A, the data writing module 14 may include a data writing transistor T5, a first electrode of the data writing transistor T5 receives a data writing signal Data, a second electrode of the data writing transistor T5 is electrically connected to the first electrode of the driving transistor T1, and the gate of the data writing transistor T5 receives a second scanning signal S2. In addition, the compensation module 15 in the first pixel circuits 10A may include a compensation transistor T6, a first electrode of the compensation transistor T6 is electrically connected to a second electrode of the driving transistor T1, a second electrode of the compensation transistor T6 is electrically connected to the gate of the driving transistor T1, and the gate of the compensation transistor T6 receives a third scanning signal S3. In the data writing phase t12, the second scanning signal S2 controls the data writing transistor T5 to be "on", and the third scanning signal S3 controls the compensation transistor T6 to be "on", so that the data signal Data is sequentially transmitted to the gate of the driving transistor T1 through the conducted data writing transistor T5, the driving transistor T1 and the compensation transistor T6. It should be noted that the channel types of the data writing transistor T5 and the compensation transistor T6 may be the same or different, which are not specifically limited herein. Optionally, taking a channel type of the data writing transistor T5 and the compensation transistor T6 as an example, the scanning signal that controls the data writing transistor T5 and the compensation transistor T6 to be "on" may be the same scanning signal, that is, the second scanning signal S2 may be multiplexed into the third scanning signal S3, which may be configured according to actual conditions and is not specifically limited herein. FIG. 2 is only an exemplary illustration and does not limit the embodiments of the present disclosure.

Figure 6:
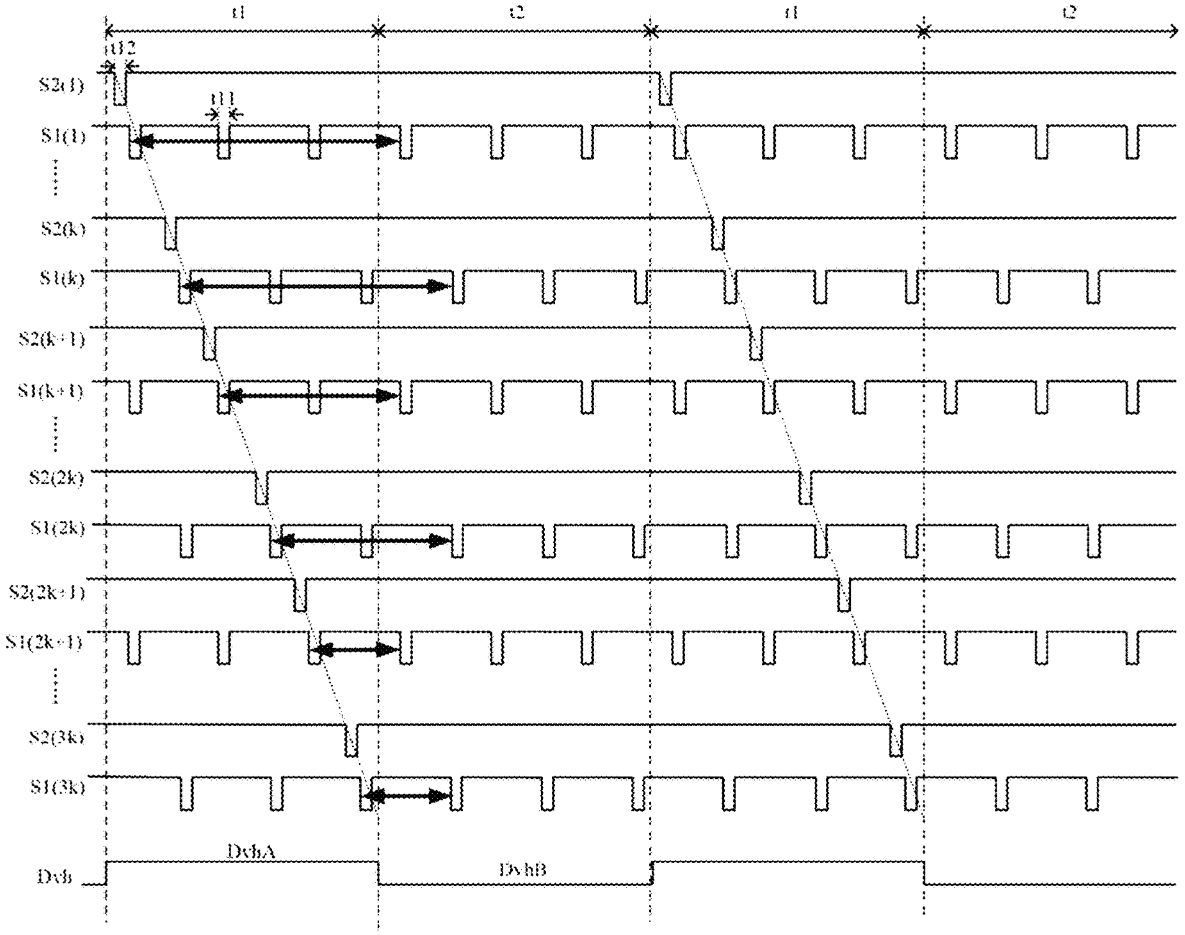
FIG. 6 is a driving timing diagram of a display panel in the existing technology.

FIG. 6 is a driving timing diagram of a display panel in the existing technologies. Refer to FIG. 6, taking as an example, the display area AA of the display panel 100 includes 3k rows of first pixel circuits 10A, the first scanning signal S1 controls the enabling level of the bias adjustment module 12 to be low, and the second scanning signal S2 controls the enabling level of the data writing module 14 to be low. FIG. 6 exemplarily shows the driving timing diagram of each row of the first pixel circuits 10A in at least one driving cycle.

Refer to FIG. 6, for the same first pixel circuits 10A, in the data writing frame t1, the bias adjustment module 12 provides the first bias adjustment signal DvhA to the first electrode of the driving transistor T1, and in the holding frame t2, the bias adjustment module 12 provides the second bias adjustment signal DvhB to the first electrode of the driving transistor T1, so that the bias adjustment signal Dvh with different voltages is configured to adjust the bias state of the driving transistor T1 in the pixel circuits in different working phases, thereby improving the display performance of the display panel 100. Each first pixel circuit 10A includes n bias adjustment phases t11 in one driving cycle, where the specific value of n may be configured according to actual conditions and is not specifically limited herein. At least some of the bias adjustment phases t11 are located after the data writing phase t12, so that after the data signal Data is written to the gate of the driving transistor T1, the first bias adjustment signal DvhA continues to be written to the first electrode of the driving transistor T1 in the bias adjustment phases t11, so as to further ameliorate the characteristic offset of the driving transistor T1. However, it may be seen from FIG. 6 that, from the first pixel circuits 10A in the first row to the first pixel circuits 10A in the last row (i.e., the 3k-th row), in the data writing frame t1, the enabling level (i.e., low level) of the second scanning signal S2 that controls the data writing modules 14 in the first pixel circuits 10A in each row to be "on" in sequence in the data writing phase t12 is shifted in sequence. When entering the holding frame t2, since the bias adjustment signal Dvh leaps from the first bias adjustment signal DvhA to the second bias adjustment signal DvhB, it causes the durations that the first pixel circuits 10A in each row to write the first bias adjustment signal DvhA to the first electrode of the driving transistor T1, between the bias adjustment phases t11 after the data phase t12 and the first bias adjustment phase t11 in the holding frame t2 (refer to the durations indicated by the black bidirectional bold arrows in FIG. 6), are not exactly the same. This causes all first pixel circuits 10A in the display area AA to adjust the bias state of the driving transistor T1 through the first bias adjustment signal DvhA after the data writing phase t12 for different durations, thereby affecting the difference in brightness of the light-emitting elements D driven by the driving transistor T1 in the first pixel circuits 10A located in different rows, thereby reducing the display performance of the entire display panel 100.

Based on the above problem, in the disclosed embodiment, within a driving cycle, the duration for writing the first bias adjustment signal DvhA to the first electrode of the driving transistor T1 in the first pixel circuits 10A during the bias adjustment phases t11 after the data writing phase t12 is configured to be the first duration $T_0$, and a first duration Δt of each first pixel circuit 10A within a driving cycle is the same, so that the duration for adjusting the bias state of the driving transistor T1 by the first bias adjustment signal DvhA after the data writing phase t12 of each first pixel circuit 10A in the display area AA can be the same, thereby causing the driving transistor T1 of the first pixel circuits 10A in each sub-display area to have the same conducted bias state, which facilitates improving the display uniformity of the display panel 100.

It should be noted that the specific voltages of the first bias adjustment signal DvhA and the second bias adjustment signal DvhB can be configured according to actual conditions, and are not specifically limited herein. FIG. 6 is only an exemplary illustration. Unless otherwise specified, the relationship between the voltage of the first bias adjustment signal DvhA and the voltage of the second bias adjustment signal DvhB in the driving timing diagram provided below is shown as an example, which does not limit the embodiments of the present disclosure.

Figure 7:
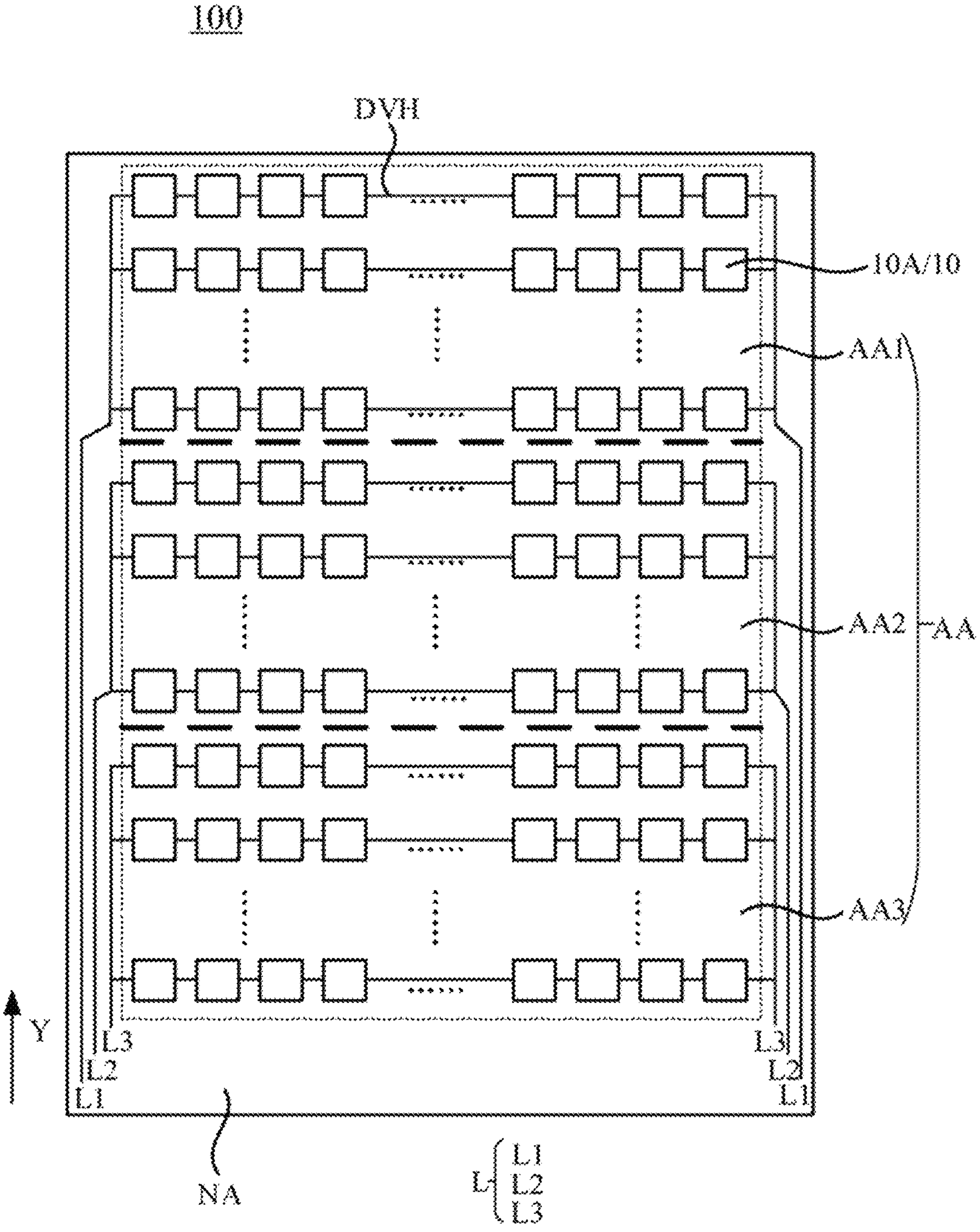
FIG. 7 is a schematic diagram of another display panel in accordance with an embodiment of the present disclosure.

Optionally, FIG. 7 is a schematic diagram of another display panel in accordance with an embodiment of the present disclosure. As shown in FIG. 7, the display area AA includes a plurality of sub-display areas, and the plurality of sub-display areas are arranged along the column direction Y of the first pixel circuits 10A. The display panel 100 includes a plurality of bias adjustment buses L and a plurality of bias adjustment signal lines DVH. The same bias adjustment signal line DVH is electrically connected to the bias adjustment module 12 of at least some of the first pixel circuits 10A in the same row, the bias adjustment signal lines DVH in the same sub-display area are electrically connected to a same bias adjustment bus L, and the bias adjustment signal lines DVH in different sub-display areas are electrically connected to different bias adjustment buses L.

The number of sub-display areas may be configured according to actual conditions and is not specifically limited herein. It should be understood that the number of sub-display areas is the same as the number of bias adjustment buses L.

Exemplarily, FIG. 7 shows that the display area AA includes three sub-display areas, respectively, a first sub-display area AA1, a second sub-display area AA2 and a third sub-display area AA3, and the bias adjustment bus L includes three bias adjustment buses L, respectively, L1, L2 and L3. In this way, the bias adjustment module 12 of the first pixel circuits 10A in the same sub-display area receives the bias adjustment signal Dvh provided by the same bias adjustment bus L. By adjusting the time when different bias adjustment buses L provide the first bias adjustment signal DvhA and the second bias adjustment signal DvhB to the bias adjustment modules 12 of the first pixel circuits 10A in different display areas, the time when the first electrode of the driving transistor T1 in the first pixel circuits 10A in each sub-display area writes the first bias adjustment signal DvhA in the bias adjustment phases t11 after the data writing phase t12 is a first time $T_0$, so as to ensure that the driving transistor T1 of the first pixel circuits 10A in each sub-display area has the same bias state, which facilitates balancing the display performance of each sub-display area, thereby ameliorating the flickering or split screen phenomenon of the display panel 100.

Optionally, within a same driving cycle, the number of bias adjustment phases t11 contained in a data writing frame t1 of the first pixel circuits 10A is the same as the number of bias adjustment phases t11 contained in a holding frame t2, and the number m of sub-display areas satisfies m=n/2.

Here, n can be any value that is an integer multiple of 2 and is not specifically limited herein.

Specifically, in a same driving cycle, the duration of the data line writing frame t1 and the holding frame t2 can be the same. When each first pixel circuit 10A includes n bias adjustment phases t11 in one driving cycle, and the number of bias adjustment phases t11 contained in the data writing frame t1 is the same as the number of bias adjustment phases t11 contained in the holding frame t2, and the number of bias adjustment phases t11 contained in the data writing frame t1 or the holding frame t2 is n/2. Further, the number of sub-display areas divided in the display area AA can be determined according to the number of bias adjustment phases t11 contained in the data writing frame t1 or the holding frame t2, that is, the number m of sub-display areas is n/2.

It should be noted that, in a same driving cycle, the interval between any two adjacent bias adjustment phases t11 is the same.

Optionally, among the m sub-display areas, at least m−1 sub-display areas include k rows of first pixel circuits 10A, where $k=\lfloor T/m \rfloor$, where T is the duration for writing a frame of data, and $\lfloor\ \rfloor$ indicates rounding down.

It should be understood that, since the specific number of rows of the first pixel circuits 10A in the display area AA of the display panel 100 is related to various factors, when the display area AA is divided into m sub-display areas, it may not be ensured that the number of rows of first pixel circuits 10A included in each sub-display area is exactly the same. In this way, after determining that the display area AA includes m sub-display areas, it may be determined that at least m−1 sub-display areas include k rows of first pixel circuits 10A according to the duration T for writing a frame of data is written into the frame t1, where $k=\lfloor T/m \rfloor$. In other words, along the column direction Y, at least the first m−1 sub-display areas include the same number of rows of first pixel circuits 10A, which can ensure as much as possible that the m sub-display areas have the same or similar number of rows of first pixel circuits 10A.

Figure 8:
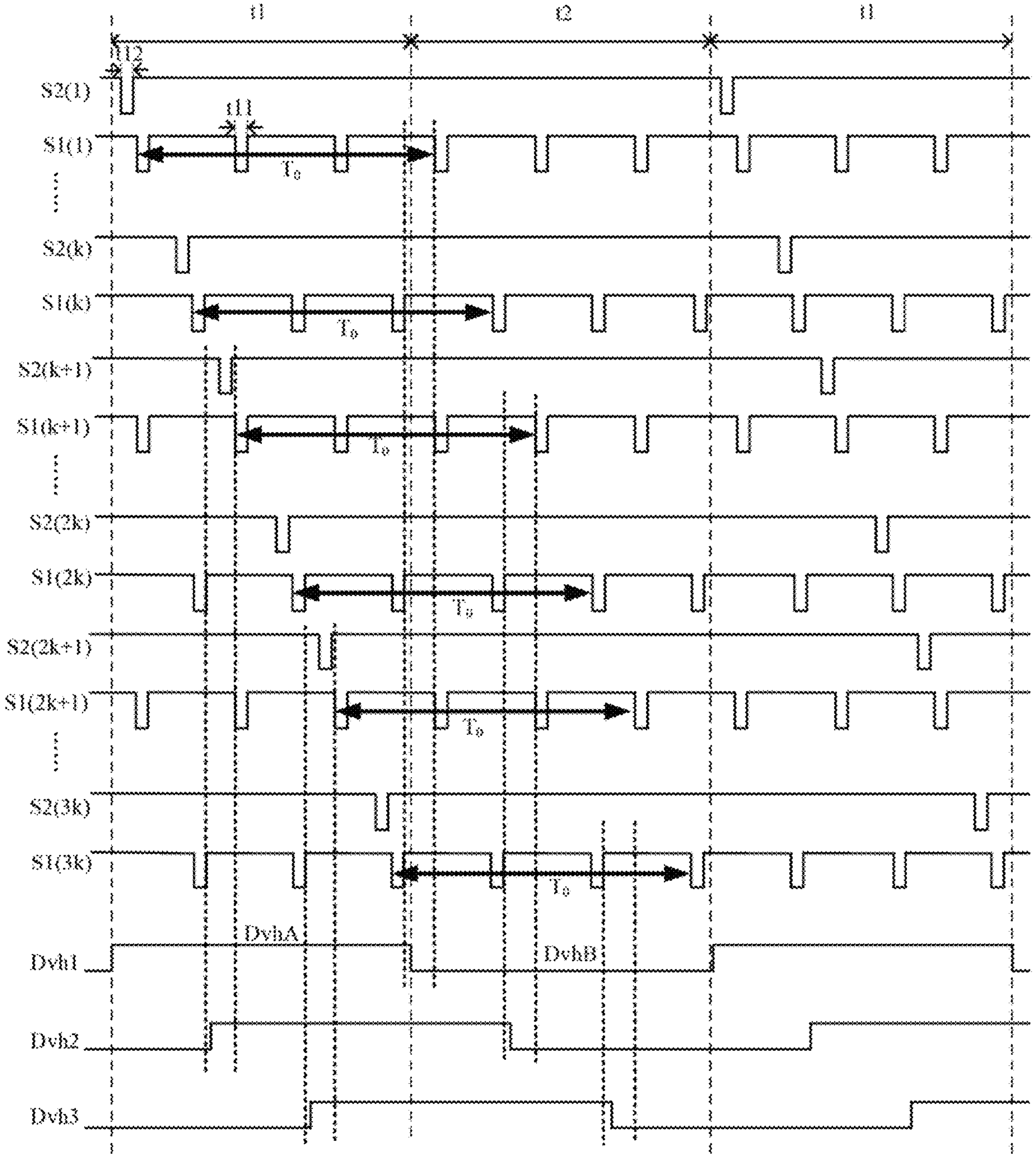
FIG. 8 is a driving timing diagram of FIG. 7.

Exemplarily, FIG. 8 is a driving timing diagram of FIG. 7. Refer to FIG. 7 and FIG. 8 in combination, FIG. 7 exemplarily shows that the display area AA includes three sub-display areas, respectively AA1, AA2 and AA3, where the first pixel circuits 10A in the first row to the first pixel circuits 10A in the k-th row are located in the first sub-display area AA1, the first pixel circuits 10A in the (k+1)-th row to the first pixel circuits 10A in the 2k-th row are located in the second sub-display area AA2, and the first pixel circuits 10A in the (2k+1)-th row to the first pixel circuits 10A in the 3k-th row are located in the third sub-display area AA3. Among them, the bias adjustment signal provided by the bias adjustment bus L1 electrically connected to the plurality of bias signal lines DVH in the first sub-display area AA1 is Dvh1, the bias adjustment signal provided by the bias adjustment bus L2 electrically connected to the plurality of bias signal lines DVH in the second sub-display area AA2 is Dvh2, and the bias adjustment signal provided by the bias adjustment bus L3 electrically connected to the plurality of bias signal lines DVH in the third sub-display area AA3 is Dvh3.

For the bias adjustment signal Dvh transmitted by the same bias adjustment bus L, the bias adjustment module 12 of the first pixel circuits 10A in the sub-display area corresponding to the bias adjustment bus L may provide the first bias adjustment signal DvhA in the data line writing frame t1, and the bias adjustment module 12 of the first pixel circuits 10A in the sub-display area corresponding to the bias adjustment bus L can provide the second bias adjustment signal DvhB in the holding frame t2, and by adjusting the leaping times of the first bias adjustment signal DvhA and the second bias adjustment signal DvhB provided by different bias adjustment buses L, the duration for the first pixel 10A in different sub-display areas to adjust the bias state of the driving transistor T1 through the first bias adjustment signal DvhA after the data writing phase t12 may be made the same, so that the driving transistor T1 of the first pixel circuits 10A in each sub-display area has the same conducted bias state, which facilitates improving the display uniformity of the display panel 100.

Optionally, continue to refer to FIG. 8, in the same sub-display area, the start time of the first bias adjustment signal DvhA transmitted by the bias adjustment bus L is located after the end time of the last bias adjustment phase t11 before the data writing phase t12 of the first pixel circuits 10A in the last row, and is located before the start time of the first bias adjustment phases t11 after the data writing phase t12 of the first pixel circuits 10A in the first row.

Exemplarily, taking as an example that the bias adjustment signal Dvh2 transmitted by the bias adjustment bus L2 is electrically connected to the plurality of bias adjustment signal lines DVH in the second sub-display area AA2, refer to FIG. 8, the first pixel circuits 10A in the first row of the second sub-display area AA2 correspond to the first pixel circuits 10A in the (k+1)-th row of the display area AA, and the first pixel circuits 10A in the last row of the second sub-display area AA2 correspond to the first pixel circuits 10A in the 2k-th row of the display area AA. In this way, the start time of the first bias adjustment signal DvhA provided by the bias adjustment signal line L2 corresponding to the second sub-display area AA2 should be before the start time of the first bias adjustment phases t11 after the data writing phase t12 of the first pixel circuits 10A in the (k+1)-th row, so as to ensure that the first pixel circuits 10A in each row of the second sub-display area AA2 transmit the first bias adjustment signal DvhA to the first electrode of the driving transistor T1 in the bias adjustment phases t12 after the data writing phase t12.

In addition, the start time of the first bias adjustment signal DvhA should also be located after the end time of the last bias adjustment phase t11 before the data writing phase t12 of the first pixel circuits 10A in the 2k-th row, so as to avoid affecting the bias adjustment signal Dvh2 adjusting the bias state of the driving transistor T1 in the first pixel circuits 10A in the 2k-th row before the data writing phase t12.

For the same reason, for the bias adjustment module 12 of the first pixel circuits 10A in the first sub-display area AA1 and the third sub-display area AA3, in the data writing frame t1, the start time of receiving the first bias adjustment signal DvhA provided by the corresponding bias adjustment bus L should also meet the above conditions, which will not be described in detail herein.

Optionally, continue to refer to FIG. 7 and FIG. 8, in the same sub-display area, the end time of the first bias adjustment signal DvhA transmitted by the bias adjustment bus L is located after the end time of the last bias adjustment phase t11 of the first pixel circuits 10A in the last row, and is located before the start time of the (1+n/2)-th bias adjustment phase t11 after the data writing phase t12 of the first pixel circuits 10 in the first row.

It should be understood that the last bias adjustment phase t11 referred herein may be determined according to the specific value of n, that is, the last bias adjustment phase t11 is the (n/2)-th bias adjustment phase t11 after the data writing phase t12. For example, if n is 6, the last bias adjustment phase t11 of the first pixel circuits 10A in each row is the third bias adjustment phase t11 after the data writing phase t12.

Specifically, in the same sub-display area, the end time of the first bias adjustment signal DvhA transmitted by the bias adjustment bus L is located after the end time of the last bias adjustment phase t11 of the first pixel circuits 10A in the last row. This can ensure that the duration, when the first electrode of the driving transistor T1 in each row of the first pixel circuits 10A writes the first bias adjustment signal DvhA in the bias adjustment phase t11 after the data writing phase t12, includes the same number of bias adjustment phases t11. Further, the end time of the first bias adjustment signal DvhA transmitted by the bias adjustment bus L should also be before the start time of the (1+n/2)-th bias adjustment phase t11 after the data writing phase t12 of the first pixel circuits 10 of the first row. This makes the first electrode of the driving transistor T1 in the first pixel circuits 10A write the first bias adjustment signal DvhA in the bias adjustment phase t11 after the data writing phase t12 for a first duration $T_0$, which includes n/2 bias adjustment phases t11. This further causes the first electrode of the driving transistor T1 in each first pixel circuit 10A to write the first bias adjustment signal DvhA in the bias adjustment phase t11 after the data writing phase t12 at the same time. In this way, it may be ensured that the driving transistor T1 of the first pixel circuits 10A in each sub-display area has the same bias state, which facilitates balancing the display performance of each sub-display area, thereby ameliorating the flickering or split screen phenomenon of the display panel 100.

Exemplarily, take n=6 as an example, the bias adjustment signal Dvh2 transmitted by the bias adjustment bus L2 is electrically connected to the plurality of bias adjustment signal lines DVH in the second sub-display area AA2. Referring to FIG. 8, the data writing frame t1 and the holding frame t2 both include three bias adjustment phases t11. The end time of the first bias adjustment signal DvhA provided by the bias adjustment signal line L2 corresponding to the second sub-display area AA2 is located after the end time of the last bias adjustment phase t11 of the first pixel circuits 10A in the 2k-th row, and before the start time of the fourth bias adjustment phase t11 after the data writing phase t12 of the first pixel circuits 10 in the (k+1)-th row. Accordingly, the first duration $T_0$ when the first electrode of the driving transistor T1 in the first pixel circuits 10A in each row of the second sub-display area AA2 writes the first bias adjustment signal DvhA in the bias adjustment phase t11 after the data writing phase t12 may include three bias adjustment phases t11. In other words, the actual duration of writing the first bias adjustment signal DvhA to the first electrode of the driving transistor T1 of the first pixel circuits 10A is the duration from the start time of the first bias adjustment phase t11 after the data writing phase t11 to the start time of the fourth bias adjustment phase t11 (i.e., the duration indicated by the black bidirectional bold arrows in FIG. 8).

Similarly, the end time when the bias adjustment module 12 of the first pixel circuits 10A in the first sub-display area AA1 and the third sub-display area AA3 receives the first bias adjustment signal DvhA provided by the corresponding bias adjustment bus L should also meet the above conditions, which will not be described in detail herein.

It should be noted that the specific duration of the first bias adjustment signal DvhA provided by different bias adjustment buses L may be exactly the same or may be different. The present disclosure makes no specific limitations as long as the start time and end time of the first bias adjustment signal DvhA provided by any bias adjustment bus L meet the above requirements.

Figure 9:
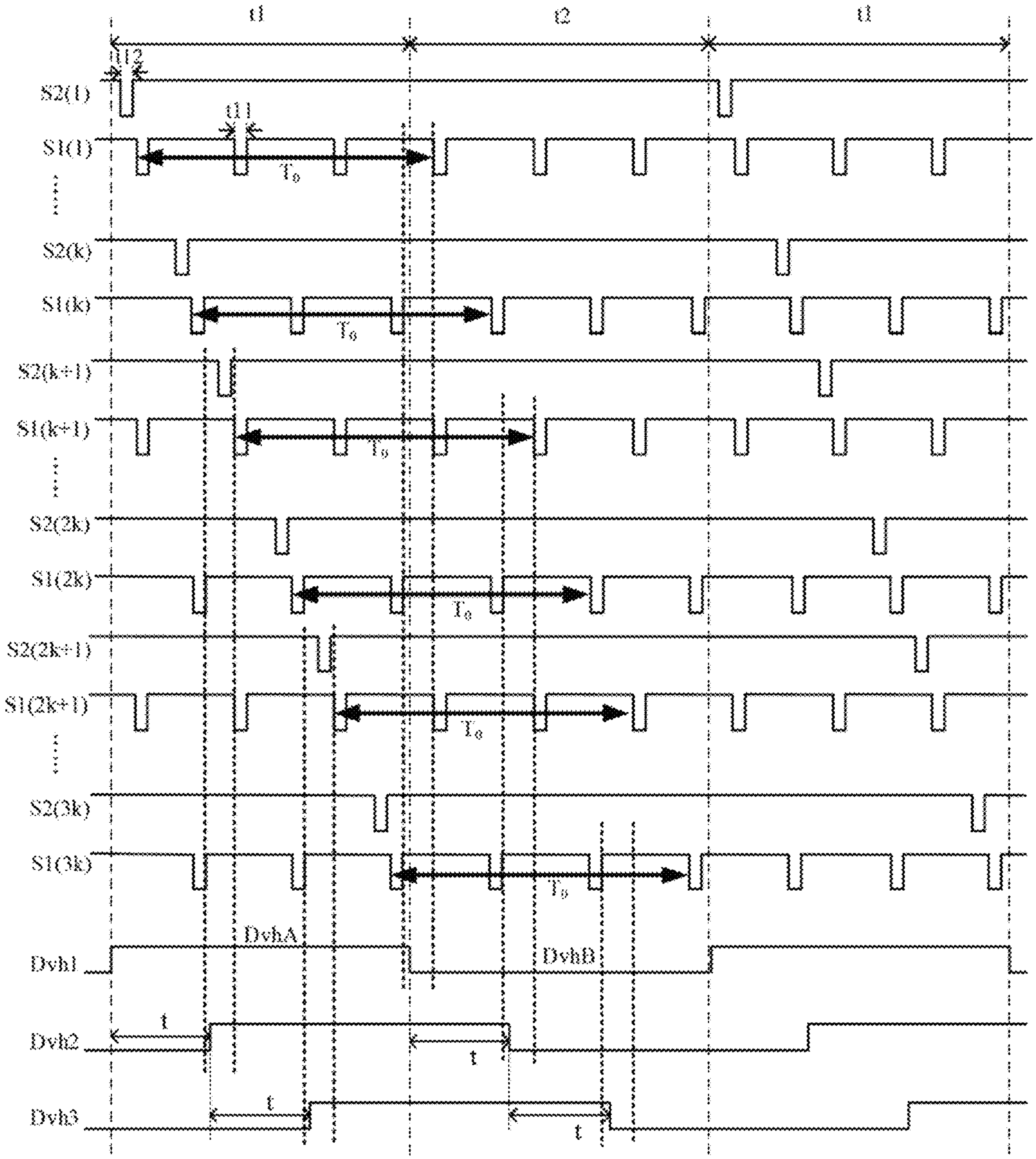
FIG. 9 is another driving timing diagram of FIG. 7.

Optionally, FIG. 9 is another driving timing diagram of FIG. 7. Refer to FIG. 7 and FIG. 9 in combination, in a same driving cycle, the interval between the start times of the first bias adjustment signal DvhA or the second bias adjustment signal DvhB transmitted by any two adjacent bias adjustment buses L is T/m, where T is the duration to write a frame of data into a frame.

Specifically, the interval Δt between the start times of the first bias adjustment signal DvhA or the second bias adjustment signal DvhB transmitted by any two adjacent bias adjustment buses L may be different according to the specific value of the number m of the sub-display areas that the display area AA in the display panel 100 are divided into. By configuring the interval between the start times of the first bias adjustment signal DvhA or the second bias adjustment signal DvhB transmitted by any two adjacent bias adjustment buses L to be T/m in a same driving cycle, the duration of each bias adjustment bus L transmitting the first bias adjustment signal DvhA or the second bias adjustment signal DvhB is the same.

Exemplarily, taking m=3 as an example, continue to refer to FIG. 9, when the bias adjustment signal Dvh1 transmitted by the bias adjustment bus L1 corresponding to the first sub-display area AA1 changes periodically with the data writing frame t1 and the holding frame t2, the bias adjustment signal Dvh2 transmitted by the bias adjustment bus L2 corresponding to the second sub-display area AA2 may be directly adjusted to be delayed by a duration of T/m compared to the bias adjustment signal Dvh1. Similarly, the bias adjustment signal Dvh3 transmitted by the bias adjustment bus L3 corresponding to the third sub-display area AA3 may be delayed by a duration of T/m compared to the bias adjustment signal Dvh2. In this way, the algorithm difficulty of a driving chip providing the bias adjustment signal Dvh for different bias adjustment signal lines L may be simplified. At the same time, it may be ensured that within one driving cycle, the first electrode of the driving transistor T1 in the first pixel circuits 10A in each sub-display area writes the first bias adjustment signal DvhA at the same time in the bias adjustment phase t11 after the data writing phase t12. This thus causes the driving transistor T1 of the first pixel circuits 10A in each sub-display area to have the same conducted bias state, which facilitates improving the display uniformity of the display panel 100.

Figure 10:
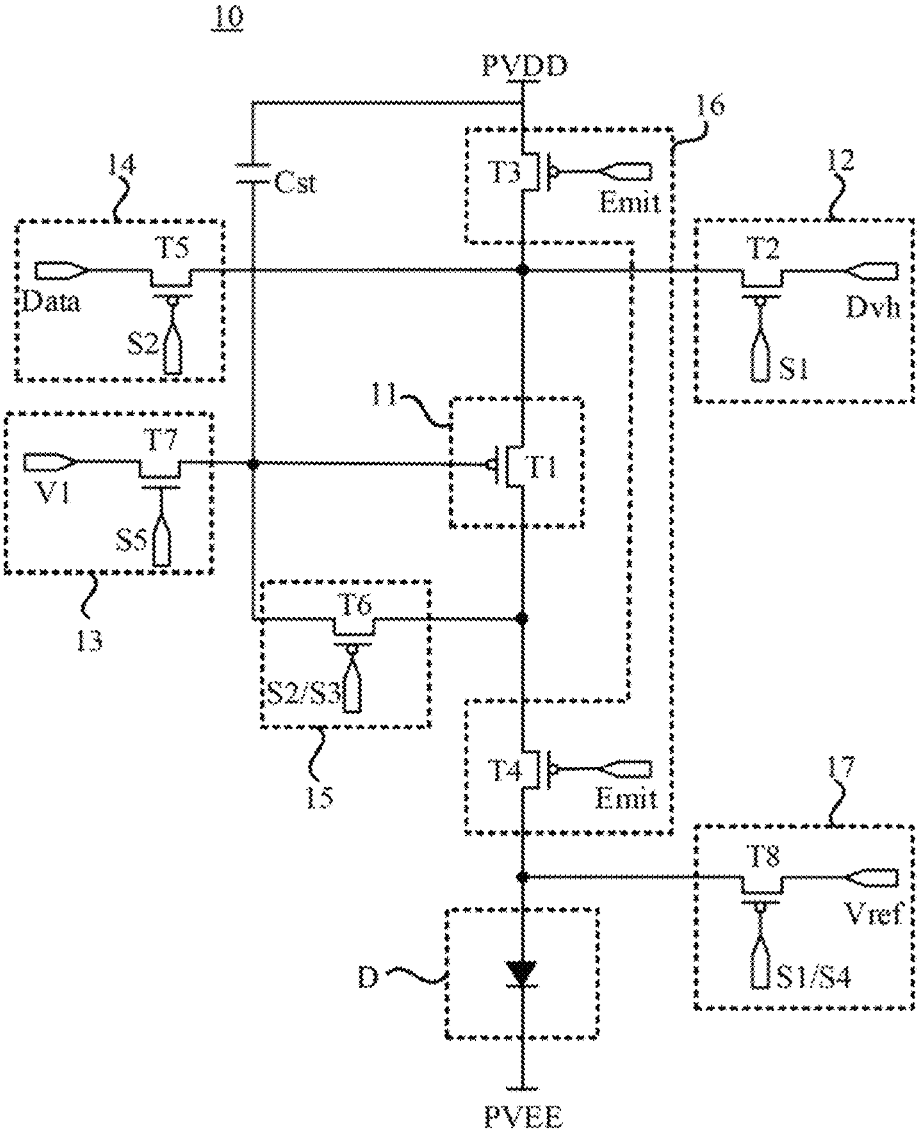
FIG. 10 is a schematic diagram of another pixel circuit in accordance with an embodiment of the present disclosure.

Optionally, FIG. 10 is a schematic diagram of another pixel circuit in accordance with an embodiment of the present disclosure. As shown in FIG. 10, the pixel circuit 10 also includes a first reset module 17 which is electrically connected to the anode of the light-emitting element D. The first reset module 17 is configured to provide a reset signal Vref to the anode of the light-emitting element D during a reset phase. In the same pixel circuit 10, the bias adjustment phase is multiplexed as the reset phase.

Refer to FIG. 10, the first reset module 17 includes an anode reset transistor T8, a first end of the anode reset transistor T8 receives the reset signal Vref, a second end of the anode reset transistor T8 is electrically connected to the anode of the light-emitting element D, and the gate of the anode reset transistor T8 receives a fourth scanning signal S4. The fourth scanning signal S4 controls the anode reset transistor T8 to be "on" or "off", and writes the reset signal Vref into the anode of the light-emitting element D when the anode reset transistor T8 is "on", so as to avoid the influence of the voltage signal written in the previous frame, thereby improving the display performance of the display panel 100.

Furthermore, in the same pixel circuit 10, the bias adjustment phase is multiplexed as the reset phase. Therefore, in each bias adjustment phase, the first reset module 17 also provides a reset signal Vref to the anode of the light-emitting element D to reset the anode of the light-emitting element D, thereby further improving the display performance.

Optionally, the first scanning signal S1 may be multiplexed as the fourth scanning signal S4 to reduce the number of scanning signal lines, thereby facilitating a thinner and lighter display panel 100 and a narrow frame design.

In addition, continue to refer to FIG. 2 or FIG. 10, the initialization module 13 in the pixel circuit 10 may include an initialization transistor T7, a first electrode of the initialization transistor T7 receives an initialization signal V1, and a second electrode of the initialization transistor T7 is electrically connected to the gate of the driving transistor T1. The gate of the initialization transistor T7 receives a fifth scanning signal S5, the fifth scanning signal S5 is configured to control the initialization transistor T7 to be "on" or "off", and when the initialization transistor T7 is "on", the initialization signal V1 is written into the gate of the driving transistor T1 to initialize the potential of the gate of the driving transistor T1.

Optionally, in a same driving cycle, the reset module 17 in the first pixel circuits 10A provides a first reset signal VrefA and a second reset signal VrefB to the anode of the light-emitting element D in a time-sharing manner, and the voltage of the first reset signal VrefA is different from the voltage of the second reset signal VrefB. The time when the first reset module 17 provides the first reset signal VrefA is the same as the time when the bias adjustment module 12 provides the first bias adjustment signal DvhA. The time when the first reset module 17 provides the second reset signal VrefB is the same as the time when the bias adjustment module 12 provides the second bias adjustment signal DvhB.

The first reset signal VrefA and the second reset signal VrefB may be configured according to actual conditions and are not specifically limited herein.

Specifically, the switching time between the first reset signal VrefA and the second reset signal VrefB may be completely synchronized with the switching time between the first bias adjustment signal DvhA and the second bias adjustment signal DvhB. Accordingly, the time when the first reset module 17 provides the first reset signal VrefA is the same as the time when the bias adjustment module 12 provides the first bias adjustment signal DvhA, and the time when the first reset module 17 provides the second reset signal VrefB is the same as the time when the bias adjustment module 12 provides the second bias adjustment signal VrefB. In this way, for the same first pixel circuits 10A, in the bias adjustment phase t11 of the data writing frame t1, the bias adjustment module 12 of the first pixel circuits 10A provides the first bias adjustment signal DvhA to the first electrode of the driving transistor T1, and the first reset module 17 provides the first reset signal VrefA to the anode of the light-emitting element D. In the bias adjustment phase t11 of the frame t2, the bias adjustment module 12 of the first pixel circuits 10A provides the second bias adjustment signal DvhB to the first electrode of the driving transistor T1, while the first reset module 17 provides the second reset signal Vref B to the anode of the light-emitting element D. In this way, in different operating states of the first pixel circuits 10A, different bias adjustment signals are configured to adjust the bias state of the driving transistor T1, which can reduce the difference in the conduction bias of the driving transistor T1 of the first pixel circuits 10A at different positions, thereby reducing the difference in the brightness of the light-emitting element D. At the same time, different reset signals are used to reset the anode of the light-emitting element D, which can further compensate for the brightness difference of the light-emitting element D in the first pixel circuits 10A at different positions, which facilitates improving the display uniformity of the display panel 100.

It should be noted that the display panel 100 may also include a reset signal bus and a plurality of reset signal lines. In different embodiments of the present disclosure, the reset signal bus may be one or more, and may be configured according to the specific embodiments with reference to the configuration method of the bias adjustment bus L. A same reset signal line is electrically connected to the first reset module 17 of at least some of the first pixel circuits 10A in the same row, and the same reset signal bus may be electrically connected to a plurality of reset signal lines, so that the reset signal bus transmits reset signals of different voltages to the reset signal lines, which then transmits the signals to the first reset module 17 of the first pixel circuits 10A through the reset signal line.

Optionally, $(|DvhA|-|DvhB|)*(VrefA-VrefB)<0$, where DvhA is the voltage of the first bias adjustment signal, DvhB is the voltage of the second bias adjustment signal, VrefA is the voltage of the first reset signal, and VrefB is the voltage of the second reset signal.

Continue to refer to FIG. 10, in the same first pixel circuits 10A, the magnitude relationship between the first bias adjustment signal DvhA and the second bias adjustment signal DvhB provided by the bias adjustment module 12 in the bias adjustment phase of a data writing frame and the bias adjustment phase of a holding frame, respectively, is opposite to the magnitude relationship between the first reset signal VrefA and the second reset signal VrefB provided by the first reset module 17 in the bias adjustment phase of a data writing frame and the bias adjustment phase of a holding frame. This then ensures that the first pixel circuits 10A can adjust the bias state by applying different bias adjustment signals to the first electrode of the driving transistor T1 in different operating phases, and at the same time, can apply different reset signals, with an opposite magnitude relationship to the bias adjustment signal voltage, to the anode of the light-emitting element D for brightness compensation. The accuracy of the brightness of the light-emitting element D is improved, which facilitates the display uniformity of the display panel 100.

Figure 11:
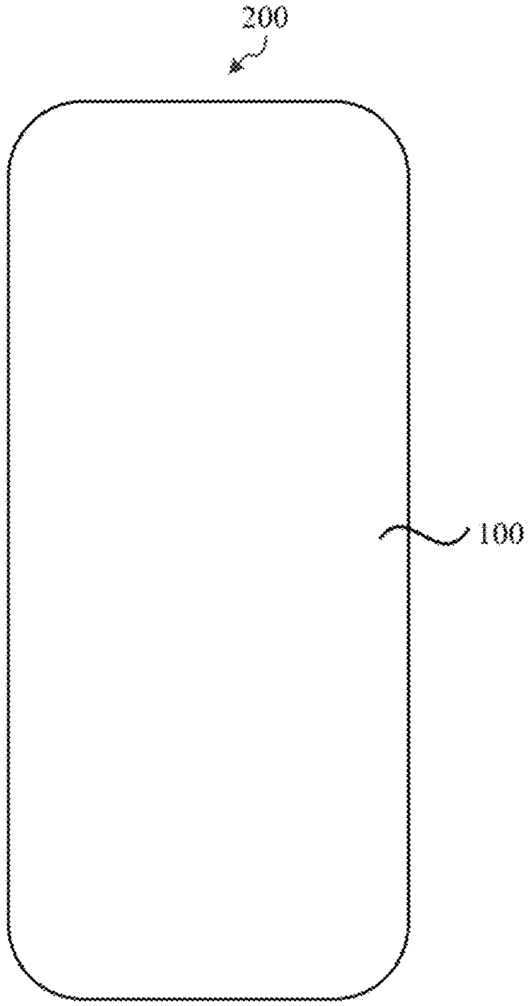
FIG. 11 is a schematic diagram of a display device in accordance with an embodiment of the present disclosure.

Based on the same inventive concept, an embodiment of the present disclosure further provides a display device. FIG. 11 is a schematic diagram of a display device in accordance with an embodiment of the present disclosure. As shown in FIG. 11, a display device 200 includes a display panel 100 in accordance with any embodiment of the present disclosure. The display device 200 in accordance with an embodiment of the present disclosure may be a mobile phone or any electronic product with a display function, including but not limited to the following categories: televisions, laptops, desktop displays, tablet computers, digital cameras, smart bracelets, smart glasses, car displays, medical equipment, industrial control equipment, touch interactive terminals, etc., which is not limited in the embodiments of the present disclosure.

The beneficial effects realized by the present disclosure may include the following.

The solution provided by the present disclosure is to set the display area of the display panel to include a plurality of pixel circuits arranged in an array, and the pixel circuit includes a driving module, a bias adjustment module and a light-emitting element. In a same pixel circuit, the driving module is configured to provide a driving current to the light-emitting element in the light-emitting stage. The driving module includes a driving transistor. The bias adjustment module is electrically connected to a first electrode of the driving transistor. The bias adjustment module is configured to provide a bias adjustment signal to the first electrode of the driving transistor in the bias adjustment stage to adjust the bias state of the driving transistor and ameliorate the threshold voltage drift problem of the driving transistor. The display mode of the display panel includes a first mode. In the first mode, at least some of the pixel circuits are the first pixel circuits. It can be understood that the first mode can be a low-frequency display mode for the entire display area, or a multi-frequency driving mode in which the entire display area includes both a low-frequency display area and a high-frequency display area. The driving cycle of the first pixel circuit includes a data writing frame and a holding frame. It can be understood that the display area where the first pixel circuit is located is a low-frequency display area. The bias adjustment module of the first pixel circuit provides a first bias adjustment signal in the bias adjustment stage of the data writing frame, and provides a second bias adjustment signal in the bias adjustment stage of the holding frame, where the voltage of the first bias adjustment signal is different from the voltage of the second bias adjustment signal. In this way, by providing different bias adjustment signals to the first electrode of the driving transistor in different working stages, the driving transistor of the first pixel circuit has the same bias state, which can ameliorate the problem of difference in luminous brightness of the light-emitting elements caused by the difference in bias state of the driving transistors in the first pixel circuits in the data writing frame and the holding frame, thereby ameliorating the flickering or split screen phenomenon of the display panel, which is beneficial to improving the display uniformity of the display panel.

It should be noted that the above are only some embodiments of the present disclosure and the technical principles described. Those skilled in the art should understand that the present disclosure is not limited to the specific embodiments herein, and that various obvious alterations, readjustments, combinations and substitutions may be made by those skilled in the art without departing from the scope of protection of the present disclosure. Therefore, although the present disclosure has been described in more detail through the above embodiments, the present disclosure is not limited to the above embodiments, and may further include other equivalent embodiments made without departing from the spirit and principle of the present disclosure, and the scope of the present disclosure is determined by the scope of the appended claims.

What is claimed is:

1. A display panel, comprising:

a display area, the display area including a plurality of pixel circuits arranged in an array, a pixel circuit of the plurality of pixel circuits includes a driving module, a bias adjustment module and a light-emitting element, wherein:

in the same pixel circuit, the driving module is configured to provide a driving current for the light-emitting element in a light-emission phase, wherein the driving module includes a driving transistor, the bias adjustment module is electrically connected to a first electrode of the driving transistor, and the bias adjustment module is configured to provide a bias adjustment signal to the first electrode of the driving transistor in a bias adjustment phase;

a display mode of the display panel includes a first mode, and in the first mode, at least some of the pixel circuits are first pixel circuits; and a driving cycle of a first pixel circuit includes a data writing frame and a holding frame, a bias adjustment module of the first pixel circuit provides a first bias adjustment signal in a bias adjustment phase of the data writing frame, and provides a second bias adjustment signal in a bias adjustment phase of the holding frame, wherein a voltage of the first bias adjustment signal in the whole data writing frame is consistent and is different from a consistent voltage of the second bias adjustment signal in the whole holding frame.

2. The display panel according to claim 1, wherein:

the display panel includes a bias adjustment bus and a plurality of bias adjustment signal lines;

a same bias adjustment signal line is electrically connected to bias adjustment modules of at least some of the pixel circuits in a same row; and the bias adjustment bus is electrically connected to the plurality of bias adjustment signal lines.

3. The display panel according to claim 2, wherein:

in the first mode, the display area includes a plurality of sub-display areas, and the plurality of sub-display areas are arranged along a column direction of the pixel circuits;

the plurality of sub-display areas include a first sub-display area and a second sub-display area, and an interval between two adjacent data writing frames of a pixel circuit in the first sub-display area is greater than an interval between two adjacent data writing frames of a pixel circuit in the second sub-display area; and the first pixel circuits are located in the first sub-display area.

4. The display panel according to claim 3, wherein a start time of a first bias adjustment signal provided by the bias adjustment bus is located before a bias adjustment phase of each of pixel circuits in the second sub-display area.

5. The display panel according to claim 3, wherein a start time of a second bias adjustment signal provided by the bias adjustment bus is located before a bias adjustment phase, of each of the first pixel circuits in the first sub-display area, within the holding frame.

6. The display panel according to claim 1, wherein:

the pixel circuits in the display area are all the first pixel circuits;

the first pixel circuit further includes a data writing module, the data writing module is electrically connected to the first electrode of the driving transistor, and the data writing module is configured to provide a data signal to a gate of the driving transistor during a data writing phase;

each of the first pixel circuits includes n bias adjustment phases in one driving cycle, and at least some of the bias adjustment phases are located after the data writing phase, wherein n is a positive integer greater than 1;

in the driving cycle, a duration for writing the first bias adjustment signal to the first electrode of the driving transistor in the first pixel circuit in bias adjustment phases after the data writing phase is a first duration; and the first duration of each of the first pixel circuits in one driving cycle is the same.

7. The display panel according to claim 6, wherein:

the display area includes a plurality of sub-display areas, and the plurality of sub-display areas are arranged along a column direction of the first pixel circuits;

the display panel includes a plurality of bias adjustment buses and a plurality of bias adjustment signal lines;

a same bias adjustment signal line is electrically connected to the bias adjustment module of at least some of the first pixel circuits in a same row; and bias adjustment signal lines located in a same sub-display area are electrically connected to a same bias adjustment bus, and bias adjustment signal lines located in different sub-display areas are electrically connected to different bias adjustment buses.

8. The display panel according to claim 7, wherein:

in a same driving cycle, a number of bias adjustment phases contained in the data writing frame of the first pixel circuits is the same as a number of bias adjustment phases contained in the holding frame; and a number m of the sub-display areas satisfies $m=n/2$.

9. The display panel according to claim 8, wherein, in a same sub-display area, a start time of a first bias adjustment signal transmitted by a bias adjustment bus is located after an end time of a last bias adjustment phase before a data writing phase of first pixel circuits in a last row, and is located before a start time of a first bias adjustment phase after a data writing phase of first pixel circuits in a first row.

10. The display panel according to claim 8, wherein, in a same sub-display area, an end time of a first bias adjustment signal transmitted by a bias adjustment bus is located after an end time of a last bias adjustment phase of first pixel circuits in a last row, and is located before a start time of a $(1+n/2)$-th bias adjustment phase after a data writing phase of first pixel circuits in a first row.

11. The display panel according to claim 8, wherein, in a same driving cycle, a time difference between start times of a first bias adjustment signal or a second bias adjustment signal transmitted by any two adjacent bias adjustment buses is $T/m$, wherein Tis a duration for writing a frame of data into a frame.

12. The display panel according to claim 8, wherein, among the m sub-display areas, at least $(m-1)$ sub-display areas include k rows of first pixel circuits, wherein $k=\lfloor T/m \rfloor$, T is a duration for writing a frame of data into a frame, and $\lfloor\ \rfloor$ represents rounding down.

13. A display panel, comprising:

a display area, the display area including a plurality of pixel circuits arranged in an array, a pixel circuit of the plurality of pixel circuits includes a driving module, a bias adjustment module and a light-emitting element, wherein:

in the same pixel circuit, the driving module is configured to provide a driving current for the light-emitting element in a light-emission phase, wherein the driving module includes a driving transistor, the bias adjustment module is electrically connected to a first electrode of the driving transistor, and the bias adjustment module is configured to provide a bias adjustment signal to the first electrode of the driving transistor in a bias adjustment phase;

a display mode of the display panel includes a first mode, and in the first mode, at least some of the pixel circuits are first pixel circuits;

a driving cycle of a first pixel circuit includes a data writing frame and a holding frame, a bias adjustment module of the first pixel circuit provides a first bias adjustment signal in a bias adjustment phase of the data writing frame, and provides a second bias adjustment signal in a bias adjustment phase of the holding frame, wherein a voltage of the first bias adjustment signal is different from a voltage of the second bias adjustment signal;

the pixel circuit further includes a first reset module, the first reset module is electrically connected to an anode of the light-emitting element, the first reset module is configured to provide a reset signal to the anode of the light-emitting element in a reset phase; and in the same pixel circuit, the bias adjustment phase is multiplexed as the reset phase.

14. The display panel according to claim 13, wherein:

in a same driving cycle, the first reset module in the first pixel circuit provides a first reset signal and a second reset signal to the anode of the light-emitting element through time-sharing, and a voltage of the first reset signal is different from a voltage of the second reset signal; and the first reset module provides the first reset signal at the same time as the bias adjustment module provides the first bias adjustment signal, and the first reset module provides the second reset signal at the same time as the bias adjustment module provides the second bias adjustment signal.

15. The display panel according to claim 14, wherein $(|DvhA|-|DvhB|)*(VrefA-VrefB)<0$, wherein DvhA is a voltage of the first bias adjustment signal, DvhB is a voltage of the second bias adjustment signal, VrefA is a voltage of the first reset signal, and VrefB is a voltage of the second reset signal.

16. A display device including at least one display panel, a display panel comprising:

a display area, the display area including a plurality of pixel circuits arranged in an array, a pixel circuit of the plurality of pixel circuits includes a driving module, a bias adjustment module and a light-emitting element, wherein:

in the same pixel circuit, the driving module is configured to provide a driving current for the light-emitting element in a light-emission phase, wherein the driving module includes a driving transistor, the bias adjustment module is electrically connected to a first electrode of the driving transistor, and the bias adjustment module is configured to provide a bias adjustment signal to the first electrode of the driving transistor in a bias adjustment phase;

a display mode of the display panel includes a first mode, and in the first mode, at least some of the pixel circuits are first pixel circuits; and a driving cycle of a first pixel circuit includes a data writing frame and a holding frame, a bias adjustment module of the first pixel circuit provides a first bias adjustment signal in a bias adjustment phase of the data writing frame, and provides a second bias adjustment signal in a bias adjustment phase of the holding frame, wherein a voltage of the first bias adjustment signal in the whole data writing frame is consistent and is different from a consistent voltage of the second bias adjustment signal in the whole holding frame.

17. The display device according to claim 16, wherein:

the display panel includes a bias adjustment bus and a plurality of bias adjustment signal lines;

a same bias adjustment signal line is electrically connected to bias adjustment modules of at least some of the pixel circuits in a same row; and the bias adjustment bus is electrically connected to the plurality of bias adjustment signal lines.

18. The display device according to claim 17, wherein:

in the first mode, the display area includes a plurality of sub-display areas, and the plurality of sub-display areas are arranged along a column direction of the pixel circuits;

the plurality of sub-display areas include a first sub-display area and a second sub-display area, and an interval between two adjacent data writing frames of a pixel circuit in the first sub-display area is greater than an interval between two adjacent data writing frames of a pixel circuit in the second sub-display area; and the first pixel circuits are located in the first sub-display area.

19. The display device according to claim 18, wherein:

a start time of a first bias adjustment signal provided by the bias adjustment bus is located before a bias adjustment phase of each of pixel circuits in the second sub-display area; and a start time of a second bias adjustment signal provided by the bias adjustment bus is located before a bias adjustment phase, of each of the first pixel circuits in the first sub-display area, within the holding frame.

20. The display device according to claim 16, wherein:

the pixel circuits in the display area are all the first pixel circuits;

the first pixel circuit further includes a data writing module, the data writing module is electrically connected to the first electrode of the driving transistor, and the data writing module is configured to provide a data signal to a gate of the driving transistor during a data writing phase;

each of the first pixel circuits includes n bias adjustment phases in one driving cycle, and at least some of the bias adjustment phases are located after the data writing phase, wherein n is a positive integer greater than 1;

in the driving cycle, a duration for writing the first bias adjustment signal to the first electrode of the driving transistor in the first pixel circuit in bias adjustment phases after the data writing phase is a first duration; and the first duration of each of the first pixel circuits in one driving cycle is the same.

* * * * *